US009692276B2

(12) United States Patent
Oteman et al.

(10) Patent No.: US 9,692,276 B2
(45) Date of Patent: Jun. 27, 2017

(54) SYSTEMS AND METHODS RELATED TO COUPLING AN ENERGY HARVESTER TO EXERCISE EQUIPMENT

(71) Applicant: Strength Companion, LLC, Delafield, WI (US)

(72) Inventors: David G. Oteman, Delafield, WI (US); Jin W. Lee, Madison, WI (US)

(73) Assignee: Strength Companion, LLC, Delafield, WI (US)

( * ) Notice: Subject to any disclaimer, the term of this patent is extended or adjusted under 35 U.S.C. 154(b) by 0 days.

(21) Appl. No.: 14/768,092

(22) PCT Filed: Jan. 15, 2015

(86) PCT No.: PCT/US2015/011602
§ 371 (c)(1),
(2) Date: Aug. 14, 2015

(87) PCT Pub. No.: WO2015/119755
PCT Pub. Date: Aug. 13, 2015

(65) Prior Publication Data
US 2015/0375028 A1    Dec. 31, 2015

Related U.S. Application Data

(60) Provisional application No. 61/941,455, filed on Feb. 18, 2014, provisional application No. 61/935,853, filed on Feb. 5, 2014.

(51) Int. Cl.
*A63B 71/00* (2006.01)
*H02K 7/18* (2006.01)
(Continued)

(52) U.S. Cl.
CPC ....... *H02K 7/1853* (2013.01); *A63B 21/0054* (2015.10); *A63B 21/0628* (2015.10);
(Continued)

(58) Field of Classification Search
CPC ............ A63B 21/0053; A63B 21/0628; A63B 2071/0072; A63B 21/0783; A63B 21/062; H02K 7/1853
(Continued)

(56) References Cited

U.S. PATENT DOCUMENTS 1,006,470 A    10/1911    Duffner
3,848,467 A    11/1974    Flavell
(Continued)

OTHER PUBLICATIONS

Non-Final Office Action, U.S Appl. No. 13/282,046, Aug. 27, 2014.

*Primary Examiner* — Joshua Lee
*Assistant Examiner* — Megan Anderson
(74) *Attorney, Agent, or Firm* — Smith Keane LLP

(57) ABSTRACT

A system and method for mechanically coupling an energy harvester to strength training type exercise equipment is disclosed. An energy harvester with unwanted vibration forces is mechanically isolated from exercise equipment by a system comprising a plurality of mechanically compliant vibration isolators and a ballast mass; a flexible cord, pre-loaded with a near constant force spring is used to transmit motion from the weight stack to the energy harvester; the flexible cord has a force limiting feature to pre-excessive force from being transmitted from the energy harvester to the weight stack during an exercise motion.

18 Claims, 10 Drawing Sheets

(51) Int. Cl.

| | |
|---|---|
| *A63B 21/062* | (2006.01) |
| *A63B 21/00* | (2006.01) |
| *A63B 24/00* | (2006.01) |
| *F03G 7/08* | (2006.01) |
| *H02J 3/00* | (2006.01) |
| *A63B 21/005* | (2006.01) |
| *F03G 5/06* | (2006.01) |
| *A63B 21/02* | (2006.01) |
| *A63B 23/035* | (2006.01) |
| *A63B 71/06* | (2006.01) |
| *A63B 21/16* | (2006.01) |

(52) U.S. Cl.
CPC ........ *A63B 21/153* (2013.01); *A63B 24/0087* (2013.01); *A63B 71/0054* (2013.01); *F03G 5/06* (2013.01); *F03G 7/08* (2013.01); *H02J 3/00* (2013.01); *A63B 21/025* (2013.01); *A63B 21/157* (2013.01); *A63B 21/169* (2015.10); *A63B 21/4035* (2015.10); *A63B 21/4043* (2015.10); *A63B 23/03533* (2013.01); *A63B 2071/0063* (2013.01); *A63B 2071/0081* (2013.01); *A63B 2071/065* (2013.01); *A63B 2209/08* (2013.01); *A63B 2209/10* (2013.01); *A63B 2220/17* (2013.01); *A63B 2220/20* (2013.01); *A63B 2225/09* (2013.01); *A63B 2225/50* (2013.01)

(58) Field of Classification Search
USPC .................................. 73/379.01; 482/2, 104
See application file for complete search history.

(56) References Cited

U.S. PATENT DOCUMENTS

| | | |
|---|---|---|
| 4,082,267 A | 4/1978 | Flavell |
| 4,261,562 A | 4/1981 | Flavell |
| 4,298,893 A | 11/1981 | Holmes |
| 6,224,519 B1 * | 5/2001 | Doolittle ............... A63B 21/152 482/5 |
| 6,342,028 B1 | 1/2002 | de Sane |
| 7,485,076 B2 | 2/2009 | Lee |
| 7,504,737 B2 | 3/2009 | Vasilovich et al. |
| 7,628,737 B2 * | 12/2009 | Kowallis .......... A63B 21/00072 482/1 |
| 7,652,386 B2 * | 1/2010 | Donelan ................... F03G 5/00 290/1 R |
| 7,704,190 B2 | 4/2010 | Lin et al. |
| 7,811,201 B1 | 10/2010 | Mikan et al. |
| 8,118,710 B2 | 2/2012 | Weinman et al. |
| 8,328,692 B2 | 12/2012 | Lin |
| 9,057,361 B2 * | 6/2015 | Donelan ................... F03G 5/00 |
| 2007/0270282 A1 | 11/2007 | Falcone |
| 2008/0172328 A1 | 7/2008 | Ajilian |
| 2009/0054207 A1 | 2/2009 | Lin et al. |
| 2009/0170661 A1 | 7/2009 | Hsiao |
| 2009/0247366 A1 | 10/2009 | Frumer |
| 2009/0280960 A1 | 11/2009 | Tian |
| 2010/0167876 A1 | 7/2010 | Cheng |
| 2010/0197460 A1 | 8/2010 | Czarnecki |
| 2011/0111922 A1 | 5/2011 | Weinman et al. |
| 2011/0234175 A1 | 9/2011 | Hajee et al. |
| 2011/0294623 A1 | 12/2011 | Alessandri et al. |
| 2012/0088634 A1 | 4/2012 | Heidecke |
| 2012/0270194 A1 | 10/2012 | Kuijpers |
| 2013/0065680 A1 | 3/2013 | Zavadsky et al. |
| 2015/0065301 A1 * | 3/2015 | Oteman ............... A63B 21/005 482/2 |

\* cited by examiner

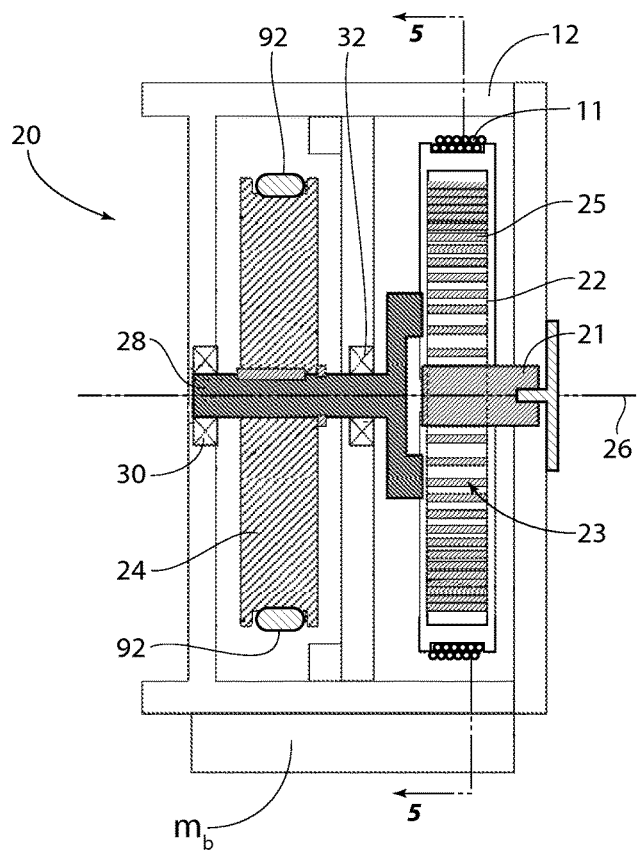
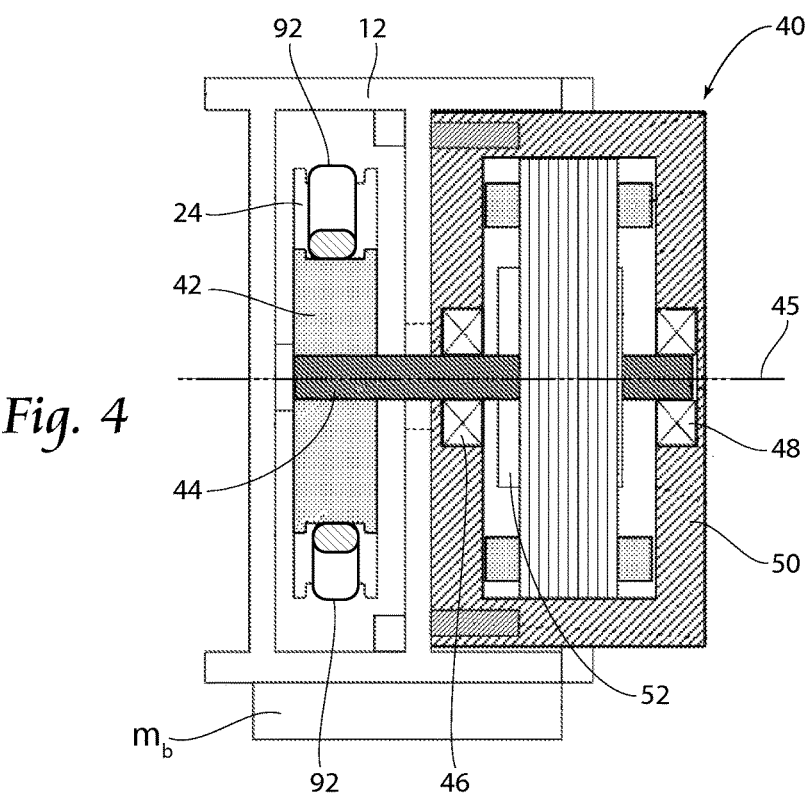

SYSTEMS AND METHODS RELATED TO COUPLING AN ENERGY HARVESTER TO EXERCISE EQUIPMENT

RELATED APPLICATIONS

This application claims the benefit of U.S. Provisional Patent Application Ser. No. 61/935,853, filed 5 Feb. 2014, and entitled "Exercise Equipment With Coupling To An Energy Harvester," which is incorporated herein by reference in its entirety.

This application also claims the benefit of U.S. Provisional Patent Application Ser. No. 61/941,455, filed 18 Feb. 2014, and entitled "Exercise Equipment With Coupling To An Energy Harvester," which is incorporated herein by reference in its entirety.

BACKGROUND OF THE INVENTION

This invention relates generally to the field of exercise equipment, and more specifically, exercise equipment having an electrical generating means. Systems and methods to produce electrical power derived from a human exercise motion, herein referred to as human-input, are known and have been reduced to practice in commercial exercise equipment products. Commercial has generally been limited to exercise products intended for cardiovascular exercise such as stationary bicycles. prior devices used for converting kinetic energy caused by human input generally includes at least one electrical generator and associated control and/or display electronics; these devices are generally referred to as an energy harvester in this disclosure. The electrical power produced is often used to provide power to an electronics load, generally known as fitness feedback electronics, typically comprising LCD displays, sensors, and communication electronics. In some examples, the equipment derives electrical power entirely from the human input, without a need to plug into an external electrical outlet. In exercise equipment that is of the strength training type, methods to produce electrical power by converting human input have been disclosed in prior literature, however the methods have generally had substantial limitations in performance.

For instance, prior systems and methods employ energy harvesters that couple directly and rigidly to a translating or rotating member of the equipment in a manner that may cause undesired ripple forces and torques. That is, that arise during a process of electromechanical energy conversion are transmitted to the user, either through the seat or the user's grip, resulting in an objectionable exercise feel to the user. The undesired forces also can result in the generation of objectionable acoustic noise, for example inducing vibrations in the lightly damped, mechanically stiff frame of exercise equipment that resonate at frequencies in the audible range. One example of a source of undesired ripple force is cogging torque in an electrical generator.

Prior art methods have disclosed energy harvesters that have rigid or semi-rigid mechanical coupling directly to an existing pulley or moving member of the exercise equipment, other than the weight stack. These prior-art arrangements generally require significant modification to the standard exercise equipment design in order to realize proper mechanical attachment of the generator, sensors, or other electronic devices. The modifications required for one equipment type, (e.g., a biceps machine), may generally not be compatible with the other types.

Another drawback of prior art methods, especially methods that rely on engagement or attachment to existing equipment pulleys, is that they are not well-suited to strength equipment that incorporates independent motion arrangements (e.g., left and right bodily motion arrangements) with a common weight stack. This type of strength equipment has become popular in the market due to its ability to emulate a "free weight" user experience. For this type of equipment, methods disclosed in the prior art generally require the use of two energy harvesters to guarantee functional operation when a user chooses to utilize only a portion (e.g., left or right side) of the motion arrangement.

Generally, the prior art methods are mechanically coupled to a rotating pulley that also provides a function to guide the main cable (or belt) of the strength equipment. In this arrangement, the energy harvester must apply torque to the pulley. To function properly, the torque applied to the pulley by the energy harvester must be limited to avoid slip between the pulley and the main cable, i.e., the torque applied by the energy harvester must be less than the torque capacity due to friction between the main cable and the pulley. When a user selects a relatively low weight, for example 10 pounds, the friction force capacity between the main belt and pulley is generally insufficient to support the function of the energy harvester to produce power from the exercise motion.

Further, as safety is usually a critical issue, prior systems and methods fail to address adequately a failure in the generator or electronics of an energy harvester. Such conditions may result in substantial torque applied to the generator shaft of the energy harvester, the torque is subsequently converted to a proportional force applied to the weight stack of the exercise equipment. Generally, the resulting force associated with a failure condition can be large and sudden and therefore harmful to a user that has a grip and is engaged in an exercise motion. For applications where the user has an exercise objective of rehabilitation or therapy, the occurrence of a large weight stack force is especially unacceptable.

SUMMARY OF THE INVENTION

An embodiment of a system according to the present invention includes an electrical generator (e.g. an alternating current or direct current generator) coupled to an exercise device. The exercise device is preferably of the type having a mechanical element forming a majority of resistive force to be overcome by an exercise motion of a user of the device. Such mechanical element may be a weight plate or a bendable rod for example. The electrical generator includes a rotatable shaft, the electrical generator being configured to produce electricity as a result of rotation of the shaft. A flexible cord is preferably coupled between the mechanical element and the electrical generator such that the shaft of the electrical generator is rotated in a first direction during motion of the flexible cord in a first cord direction. The shaft of the electrical generator may additionally be rotated in a second direction during motion of the flexible cord in a second cord direction.

According to an aspect of an embodiment of a system according to the present invention the mechanical element (e.g., one or more weight plates) may be selectively translatable along a translation path between a first position and a second position. The translation path may be linear and/or curvilinear.

According to another aspect of an embodiment of a system according to the present invention, a force limiter may be connected to the cord and to the mechanical element (e.g., weight stack), the force limiter configured to decouple the cord from the weight stack if a tension force conducted by the cord exceeds a predetermined force threshold. The force limiter may include, for example, a magnetic release arrangement and/or a mechanical fuse.

According to a further aspect of an embodiment of a system according to the present invention, the electrical generator may be a part of an energy harvester that has a frame and a reel rotatably supported by the frame, wherein the cord extends about an outer circumference of the reel. The reel my be fixed to a second shaft that is rotatably supported by the frame. The reel may include a housing radially at least partially surrounding an arbor secured to the frame, the reel substantially containing a biasing member anchored to the arbor and the housing. The biasing member may be a spring member, such as a constant (or near-constant) force spring, torsion spring, or other desirable biasing member that may be used to balance cord tension. The energy harvester may include a ballast mass coupled to its frame, the ballast mass may serve no other purpose but to increase the overall mass of the energy harvester.

According to still another aspect of an embodiment of a system according to the present invention, the electrical generator may be a part of an energy harvester that has a frame and vibration isolation mounts may be coupled to the frame. The vibration isolation mounts may be arranged between the frame and a support surface. The support surface may be attached to the exercise device, or any other surface that may counteract the force of gravity upon the energy harvester.

According to yet a further aspect of an embodiment of a system according to the present invention, when the exercise device rests upon a floor surface the energy harvester may be positioned between the floor surface and a first height parallel to the floor surface defined by at least one of the plates when the device is not being used, or its at rest position. Alternatively, all of the plates may be positioned between the floor surface and a first height parallel to the floor surface defined by the portion of the frame of the energy harvester closest to the floor surface.

BRIEF DESCRIPTION OF THE DRAWINGS

FIG. 3 depicts the 3-3 sectioned view of the energy harvester shown in FIG. 2.

FIG. 4 depicts the 4-4 sectioned view of the energy harvester shown in FIG. 2.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
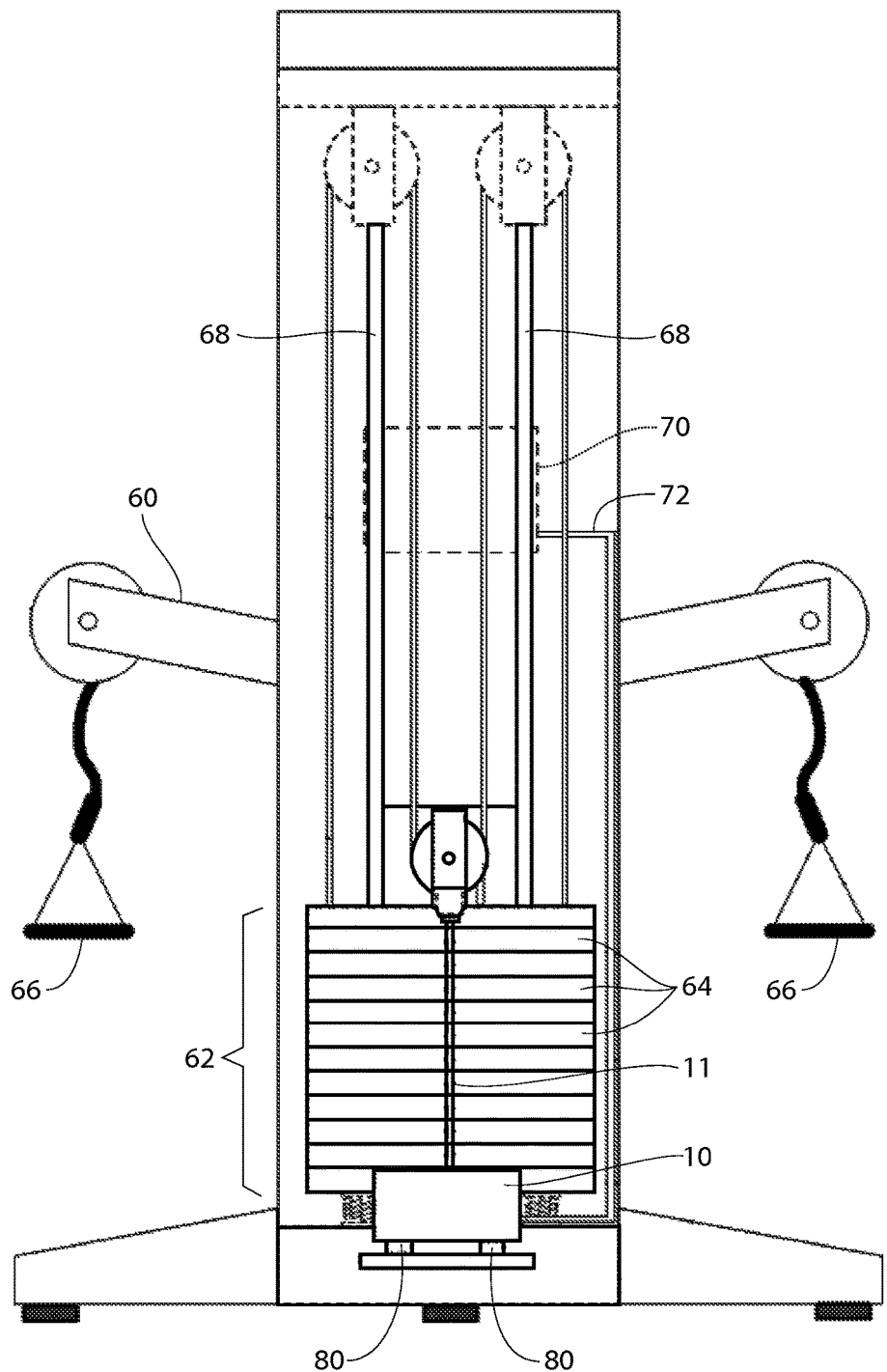
FIG. 1 is an elevation view of an exercise machine including a first embodiment of an energy harvester coupling arrangement according to the present invention.

Referring now to the figures, FIG. 1 depicts an energy harvester 10 mechanically coupled to an exercise equipment machine 60 by a flexible cable, wherein the harvester 10 produces electrical power during an exercise motion performed by a user of the machine 60. The energy harvester 10 provides electrical power to an electronics unit 70 or other electrical storage element (e.g. capacitor or battery) or load (e.g., light(s), heating elements, battery chargers, etc.), which may be electrically connected to the harvester 10 by an electrical cord 72. As is generally known, strength training machine 60 may include a weight stack 62 including one or more weight plates 64, such as steel plates, which are coupled to a user interface such as handles 66. A user exercise force applied to the handles 66 causes the plates 64 to travel in a generally linear path along one or more guide rods 68. Though described with respect to a conventional plate/guide rod exercise machine, it is to be understood that embodiments of the present invention may be applied to other strength training apparatus, such as flexible rod systems (e.g., energy harvester coupled to a handle or system cable) or even free weights (e.g., energy harvester coupled to bench press bar).

Figure 2:
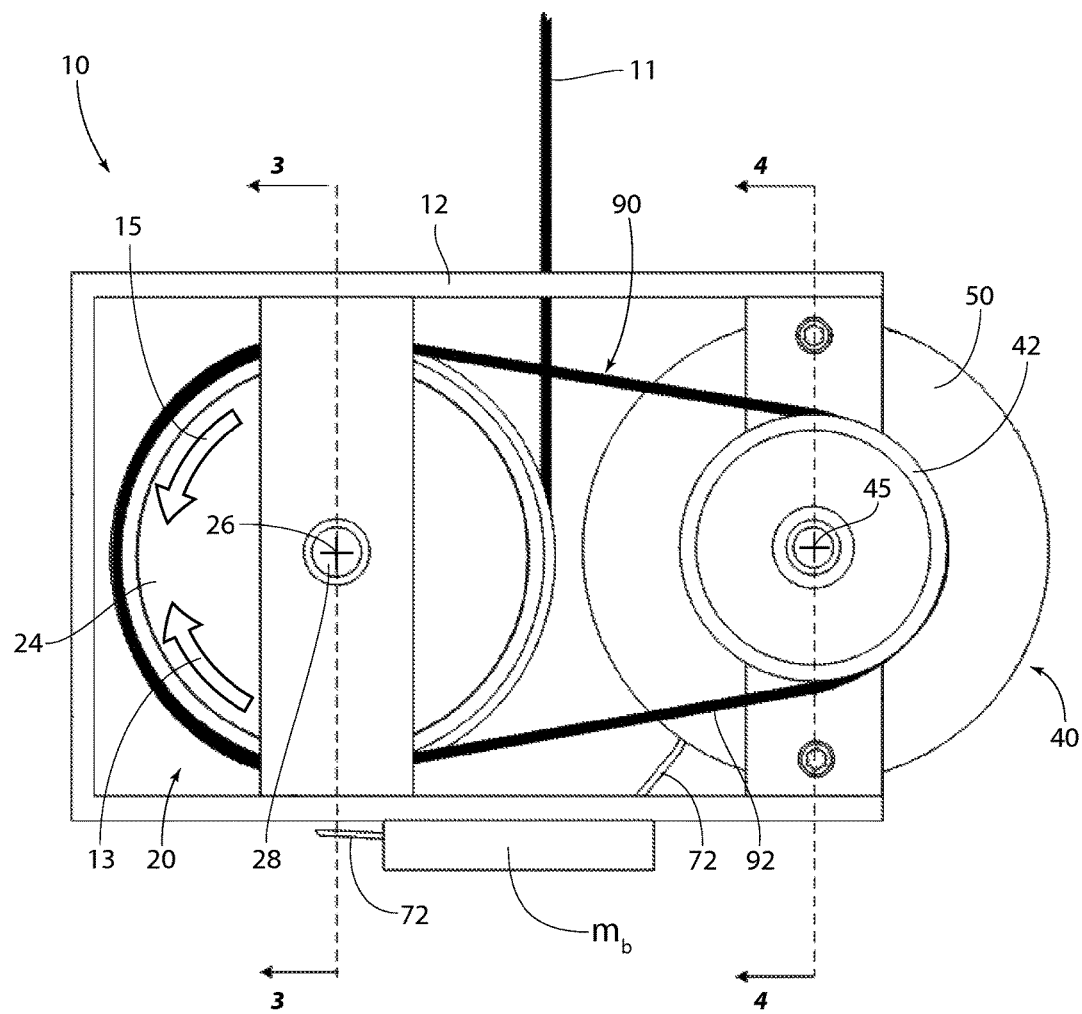
FIG. 2 is an elevation view of an embodiment of an energy harvester used in accord with an embodiment of the present invention.

Referring also to FIGS. 2-4, the energy harvester 10 comprises a frame 12, to which is coupled a mechanical arrangement including a low speed side 20 and a high speed side 40. The low speed side 20 is adapted to receive mechanical input from the indicated exercise motion and the high speed side 40 is adapted to generate the indicated electrical power to be delivered to the electronics unit 30 or otherwise stored or utilized. While the monikers "low speed" and "high speed" are used to describe the sides of the harvester 10, and components thereof, they should impart no limitations on the operation of the system as described.

Figure 5:
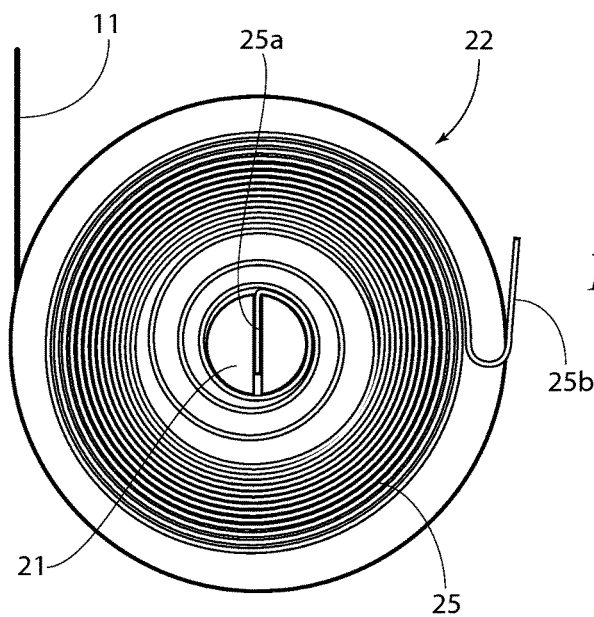
FIG. 5 depicts the 5-5 sectioned view of the energy harvester shown in FIG. 3.

The low speed side 20 preferably includes a reel 22 and a low speed pulley 24, both configured to rotate about a low speed axis 26 which may be defined by a first shaft 28 journaled and supported by a first bearing 30 and a second bearing 32, which may be supported by the frame 12. The reel 22 includes a housing 22a which is adapted to receive a cable or cord 11 about its circumference. Additionally, the housing 22a is preferably supported on the first shaft 28 and rotatable about an arbor 21, which may be fixedly supported by the frame 12, and which may lie at least substantially coaxially with the first shaft 28. The arbor 21 is preferably attached rigidly to the frame member 12 of the energy harvester 10 by an arbor fastener 21a. The arbor fastener 21a includes features (e.g. a hex key concentric with the arbor 21) that allow the arbor 21 to be rotated prior to fastening to the frame member 12. The arbor fastener 21a is affixed to the frame member 12, typically with a plurality of screws. The arbor fastener 21a can be rotated by a selected number of turns, or partial turns prior to fastening to the frame member 12. The adjustment of the arbor fastener 21a and arbor 21 enables the cord tension at rest position $CT_0$ (described hereafter) to be adjusted prior to final assembly. It is preferable that both the housing 22a and the low speed pulley 24 be fixed to the first shaft 28, such that the housing 22a, the pulley 24, and the shaft 28 rotate as a singular unit about the low speed axis 26. Such arrangement allows for mechanical energy transfer to the high speed side 40 during bidirectional rotation of the low speed pulley 24. Alternatively, the housing 22a may be clutched so as to rotate with the pulley 24 and shaft 28 in one direction and rotate only about the arbor 21 and directionally opposite the direction of rotation of the pulley 24 and shaft 28. With reference also to FIG. 5, contained substantially within the housing 22a is a biasing member 23, such as a constant force spring 25, a spiral torsion spring (also referred to as a clock spring or power spring) (not shown), or a torsion spring (not shown). A first end 25a of the spring 25 may be fixed to the arbor 21 and a second end 25b of the spring 25 may be fixed to the housing 22a. The biasing member 23 generally maintains the housing 22a biased in a first rotational direction 13. Tensile force applied to the cable 11 will overcome the bias provided by the biasing member 23 and will rotate the housing in a second rotational direction 15.

The flexible cord 11 is attached to the resistive element, such as at least one member of the weight stack 62, by a cord mounting bracket 110 that may be fastened to the top weight plate 64a or another member of the weight stack 62. The cord 11 may comprise of a variety of commercially available apparatus for transmitting force between a rotating reel or bobbin and a translating object; these apparatus include but not limited to cords, cables, belts, ribbons, and strings constructed of a variety materials. The cord 11 preferably has a length that exceeds the full potential displacement, or full excursion, of the weight stack 62 along the guide rods 68.

The high speed side 40 of the harvester 10 preferably includes a high speed pulley 42 and an electrical generator 50. The electrical generator 50 (which may be an alternating current generator or a direct current generator) includes a rotor 52 fixed to a second shaft 44. The high speed pulley 42 and the rotor 52 are configured to rotate about a high speed axis 45 which may be defined by the second shaft 44, which is preferably journaled and supported by a third bearing 46 and a fourth bearing 48. It is preferable that both the high speed pulley 42 and the rotor 52 be fixed to the second shaft 44, such that the pulley 42, rotor 52, and the shaft 44 rotate as a singular unit about the high speed axis 45. Accordingly, the generator 50 is configured to generate electricity upon rotation of the second shaft 44 in either or both rotational directions, which may ultimately be caused by rotation of the housing 22a in either direction 13 or 15.

The low speed side 20 is mechanically coupled to the high speed sided 40 by a drive member 90, such as a belt 92. The belt 92 extends about and is frictionally engaged with the low speed pulley 24 and the high speed pulley 42. The engagement of the belt 92 with the pulleys 24,42 may be enhanced by texturing the belt 92 and/or one or more of the pulleys 24,42. Further enhancement of the engagement may be provided by using toothed pulleys and a notched belt.

Figure 6:
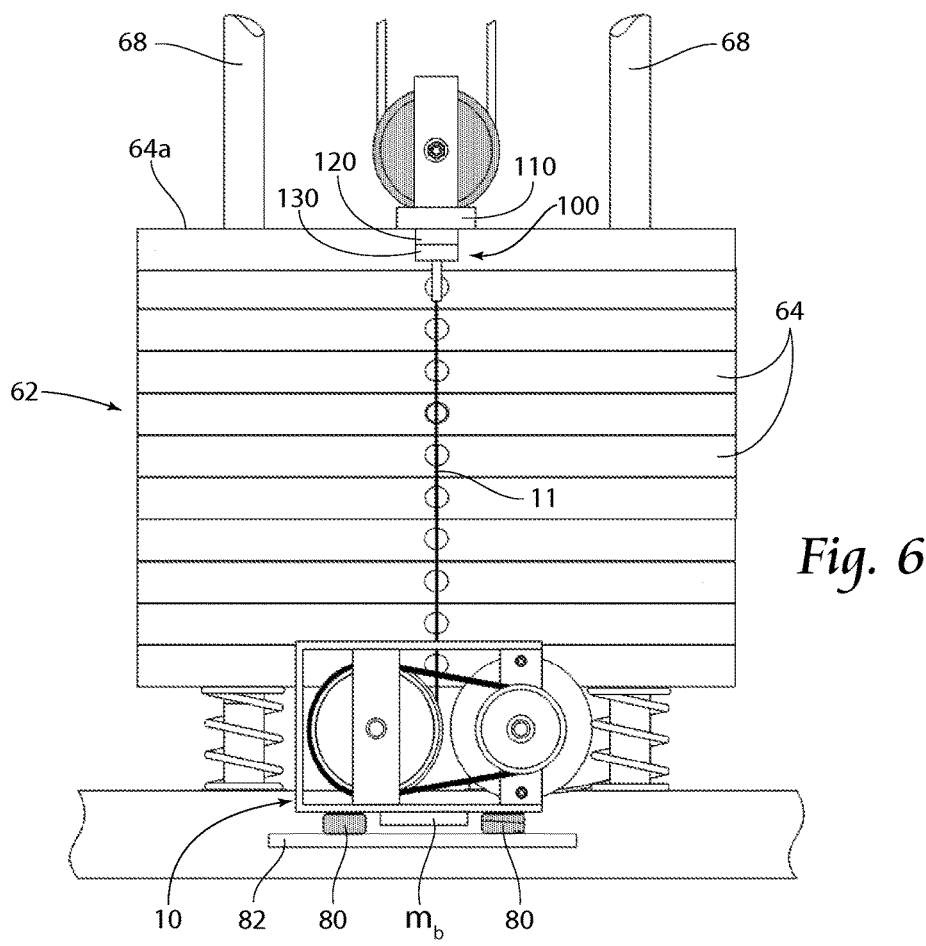
FIG. 6 is a partial view of FIG. 1.
Figure 7:
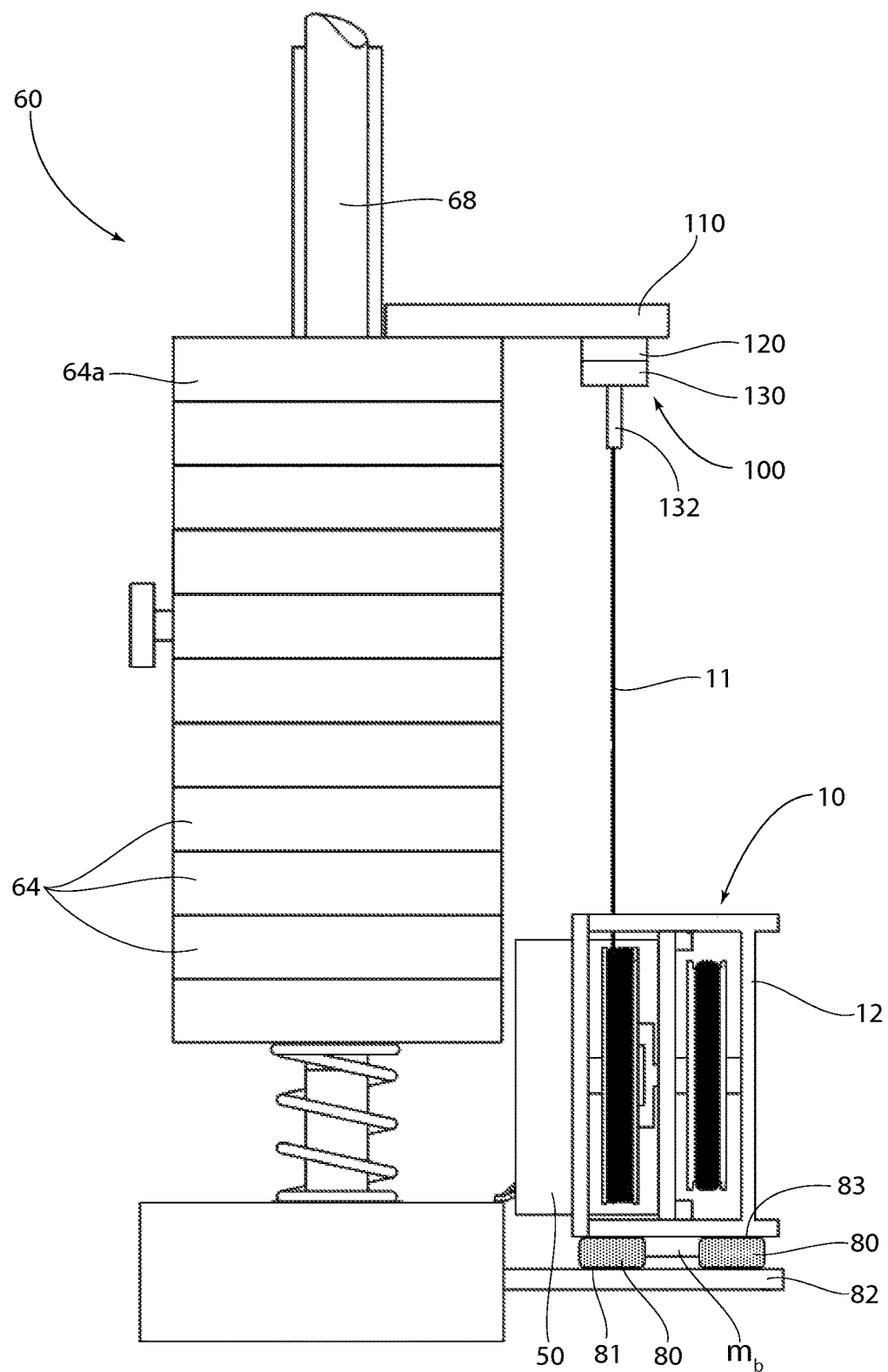
FIG. 7 is a side view of FIG. 6.
Figure 8:
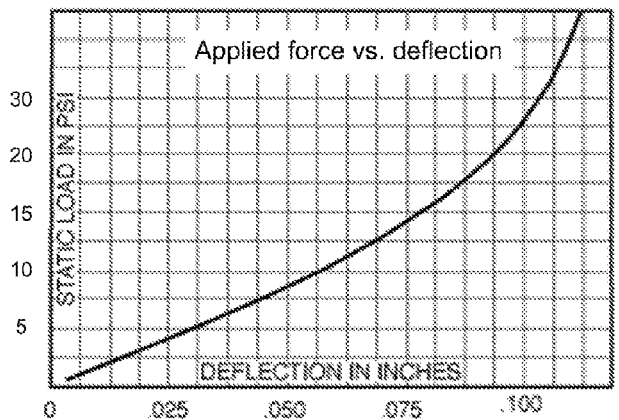
FIG. 8 is a graphical representation of an exemplary force versus displacement characteristic of an embodiment of a vibration isolation mount supporting an energy harvester in a coupling arrangement according to the present invention.

Referring more particularly to FIGS. 6 and 7, the energy harvester 10 may be supported by a plurality of vibration isolation mounts 80, the vibration isolation mounts 80 may fastened or otherwise supported on a base side 81 to an isolation frame 82 or portion of the exercise equipment 60 and fastened on a harvester side 83 to the energy harvester frame 12. An energy harvester 10 having a known mass, $m_h$, may be supported by the plurality of vibration isolation mounts 80, the vibration isolation mounts 80 having a mechanical degree of freedom to deflect in the vertical direction, and having a more limited mechanical freedom to deflect in a direction orthogonal to the vertical direction. Each vibration isolation mount 80 preferably has a stiffness characteristic, defined by a deflection of the mount 80 in response to an axially applied force, (i.e., a force applied vertically relative to the mounting orientation shown in FIG. 7). Generally, during an exercise motion, the operation of the energy harvester 10 creates a combination of forces that are supported by the vibration isolation mounts 80. A first type of force arises in response to the desired power producing function, and is generally characterized by a low frequency characteristic related to the exercise motion, the exercise motion frequencies generally occurring below 5 Hz. A second type of force refers to undesired forces, for example, forces that arise due to magnetic cogging forces within the generator 50; these undesired forces are generally characterized by the presence of higher frequency spectral content, substantially above the mechanical frequencies that arise directly in response to an exercise motion. The plurality of the vibration isolation mounts 80 has a combined stiffness characteristic or stiffness constant, $K_s$, that relates vertical force and vertical deflection, generally the combined characteristic having a stiffness greater than that of a single vibration isolation mount 80. The vibration isolation mount combined stiffness, $K_s$, and the suspended mass of the energy harvester, $m_h$, create a vibration isolation characteristic that is suitable to substantially attenuate the amplitude of undesired, higher frequency forces that are transmitted, mechanically, into the frame of the exercise equipment 60 through the vibration isolation mounts 80. A preferred combined stiffness, Ks, may be on the order of about 15 to about 150 N/mm, with about 25 to about 60 N/mm being more preferred. In one embodiment of the present invention each vibration isolation mount 80 is comprised substantially of rubber with mounting features inserted, for example a threaded nut insert, to facilitate fastening one surface of the vibration isolation mount 80 to the exercise machine 60 and the opposite surface to the energy harvester 10. A preferred force/deflection curve for each mount 80 is shown in FIG. 8. Those who are skilled in the art will recognize that there are a variety of vibration isolation apparatus that are well known, as well as a variety of methods for applying said vibration isolation mounts; it is understood that these apparatus and methods can be applied without departing for the scope and intent of the present invention. Examples include and are not limited to the use of helical springs, dampers, isolation pads, and isolation mounts constructed of rubber (e.g., urethane and/or silicone), foam, and other materials.

Vibratory effects may be further reduced by alternatively or additionally utilizing a ballast. In one embodiment of the present invention, a ballast mass $m_b$ may be used to provide an increase of the total suspended mass of the energy harvester, $m_h$. One function of the ballast mass $m_b$ is to increase attenuation of high frequency forces that are transmitted into the frame of the exercise equipment 60 through the vibration isolation mounts 80, and also to increase attenuation of high frequency forces into the weight stack 62 of the exercise equipment 60 through the flexible cord 11. Generally, the static and low frequency tension forces developed in the flexible cord 11 produce equal and opposite forces that are transmitted through the vibration mounts 80 to the exercise equipment 60 or other support surface (e.g., the isolation frame 82). The ballast mass $m_b$ is also selected to compensate for these static and low frequency tension forces to ensure sufficient compression loading of the vibration isolation mounts 80 during energy harvester operation, since certain types of vibration isolation mounts only function properly when a minimum compression force is maintained in the primary desired axis of isolation (the vertical axis according to FIG. 7). In one embodiment of the present invention, the ballast mass $m_b$ comprises a material with high density and low cost, such as carbon steel. It is understood that the ballast mass $m_b$ generally provides the function to increase the suspended mass of the energy harvester and can comprise a variety of materials without departing from the scope and intent of the present invention. In a preferred embodiment, the total mass of the energy harvester $m_h$ (which may include the ballast mass $m_b$) is substantially equal to the static tension force in the flexible cord 11.

Figure 9A:
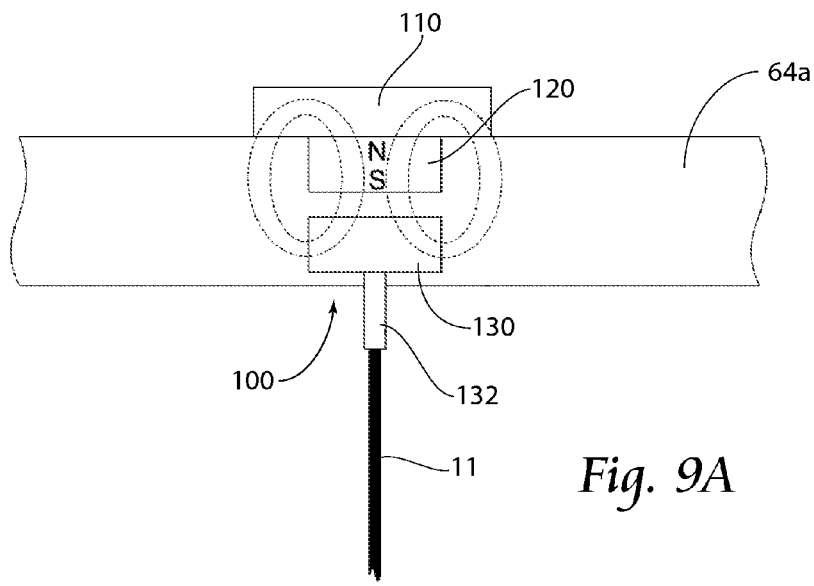
FIG. 9A is an elevation view of a first embodiment of a force limiter according to the present invention.
Figure 9B:
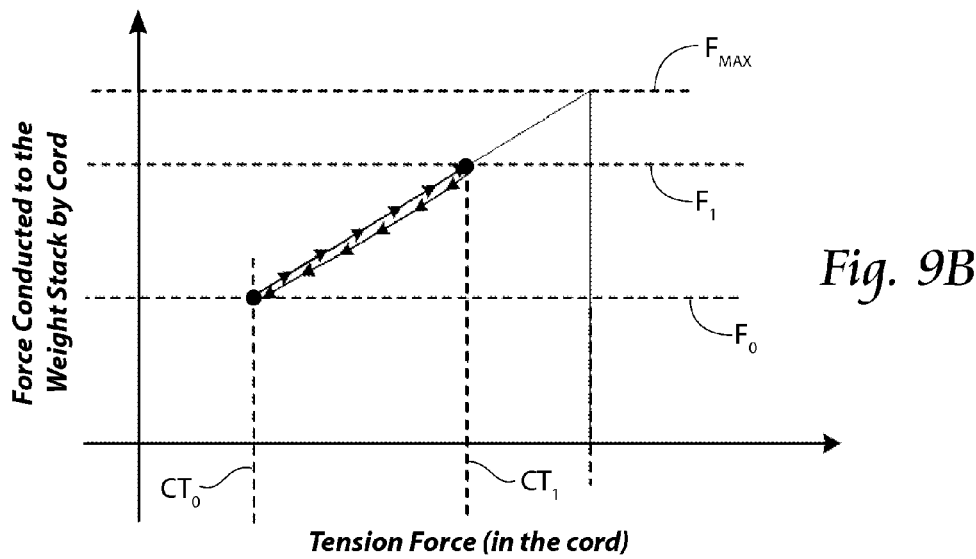
FIG. 9B is a graphical representation of the relationship of force conducted to a weight stack by a flexible cord and tension force of the flexible cord during typical operating conditions of a coupling arrangement according to the present invention.
Figure 9C:
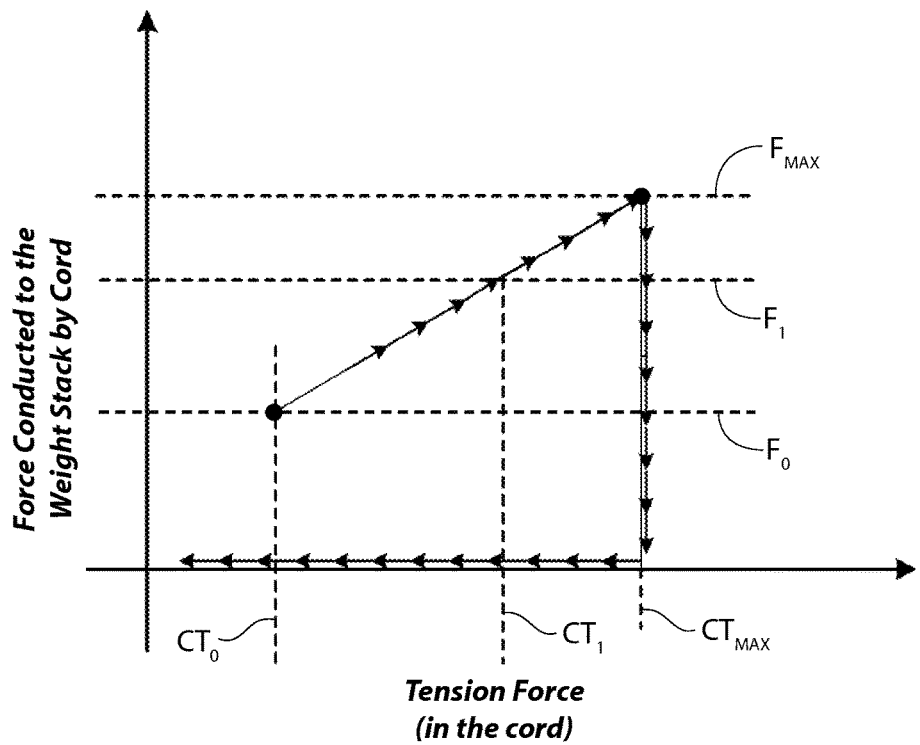
FIG. 9C is a graphical representation of the relationship of weight stack force conducted to a weight stack by a flexible cord and tension force of the flexible cord during a condition that causes activation or passive operation of a force limiter in a coupling arrangement according to the present invention.
Figure 9D:
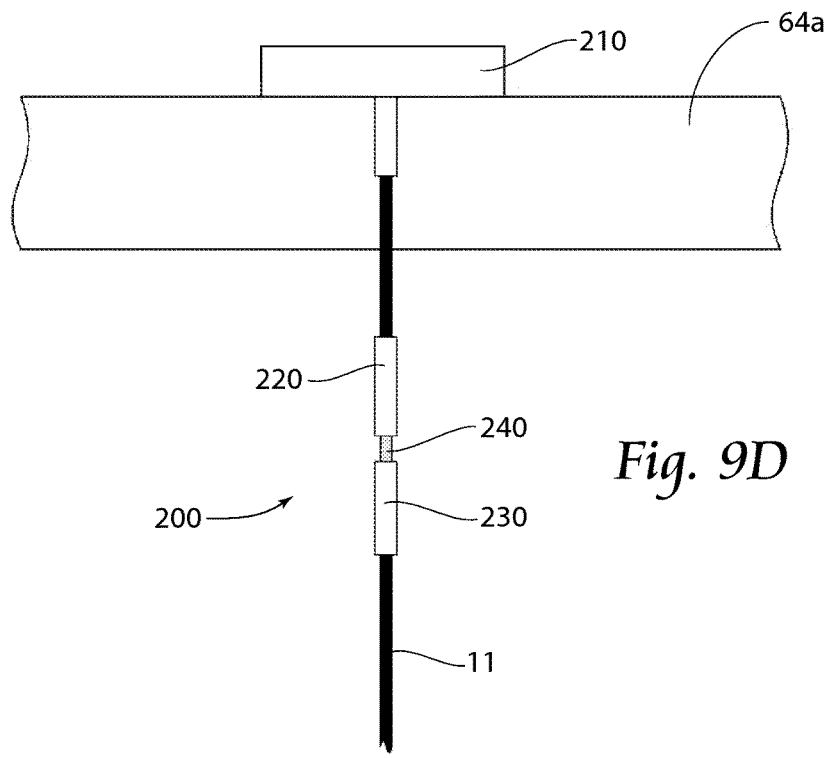
FIG. 9D is an elevation view of a second embodiment of a force limiter according to the present invention.

It may be desirable to incorporate a safety feature into an energy harvester coupling arrangement according to the present invention. FIG. 9A shows a force limiter 100 that may be preferably disposed in an inline, series connection between the flexible cord 11 and the resistive element (e.g., at least one member of the weight stack 62), such as the top plate 64a. During typical operation of the exercise equipment 60, the energy harvester 10 operates to produce electrical power, and the force limiter 100 conducts the net tension force developed by the combination of the energy harvester operation and the force developed by the biasing member 23 of the mechanical reel 22. Referring to FIG. 9B, for a range of expected operation of the exercise equipment 60, the tension in the flexible cord 11 remains within a region, or a typical operating range, between $CT_0$ and $CT_1$, that does not cause the force limiter 100 to operate or react. Referring now to FIG. 9C, the force limiter 100 has a characteristic that disconnects the mechanical connection between the flexible cord 100 and the weight stack 62 when the tension force transmitted through the force limiter 100 exceeds a limit threshold $CT_{max}$; the result after the limiter 100 reacts to an excess force, is that zero force is conducted to the weight stack by the flexible cord 11. An increased tension force in the flexible cord 11 can occur when an unexpected failure occurs within the energy harvester 10, for example, due to a seized bearing. The limit threshold $CT_{max}$ is preferably above the maximum force in the flexible cord 11 that occurs during expected operation of the exercise equipment 60, including aggressive exercise motions. In one embodiment of the present invention, referring more particularly to FIG. 9A, the force limiter 100 comprises a support member 110, a magnet 120, and a magnetic material 130 (e.g., ferrous member or another magnet). An aglet 132 or other connector may establish a mechanical connection between the magnetic material 130 and the flexible cord 11. Those who are skilled in the art will recognize that a force limiter that substantially exhibits the characteristic shown in the graph in FIG. 9C, can be accomplished by several known methods and still remain within the scope and intent of the present invention. Known methods include and are not limited to mechanical fuses, wire rope fuses, hook-and-loop materials (e.g., Velcro®), adhesives, as well as tension limiters or clutches similar to apparatus used in automotive seat belts. For example, FIG. 9D shows a second embodiment 200 of a force limiter according to the present invention. This embodiment 200 is a mechanical fuse coupled between the cord 11 and the top weight stack plate 64. The fuse includes a first anchor 220 and a second anchor 230 connected by a fuse element 240, which is adapted to break when the tension force meets or exceeds the limit threshold $CT_{max}$.

Figure 10:
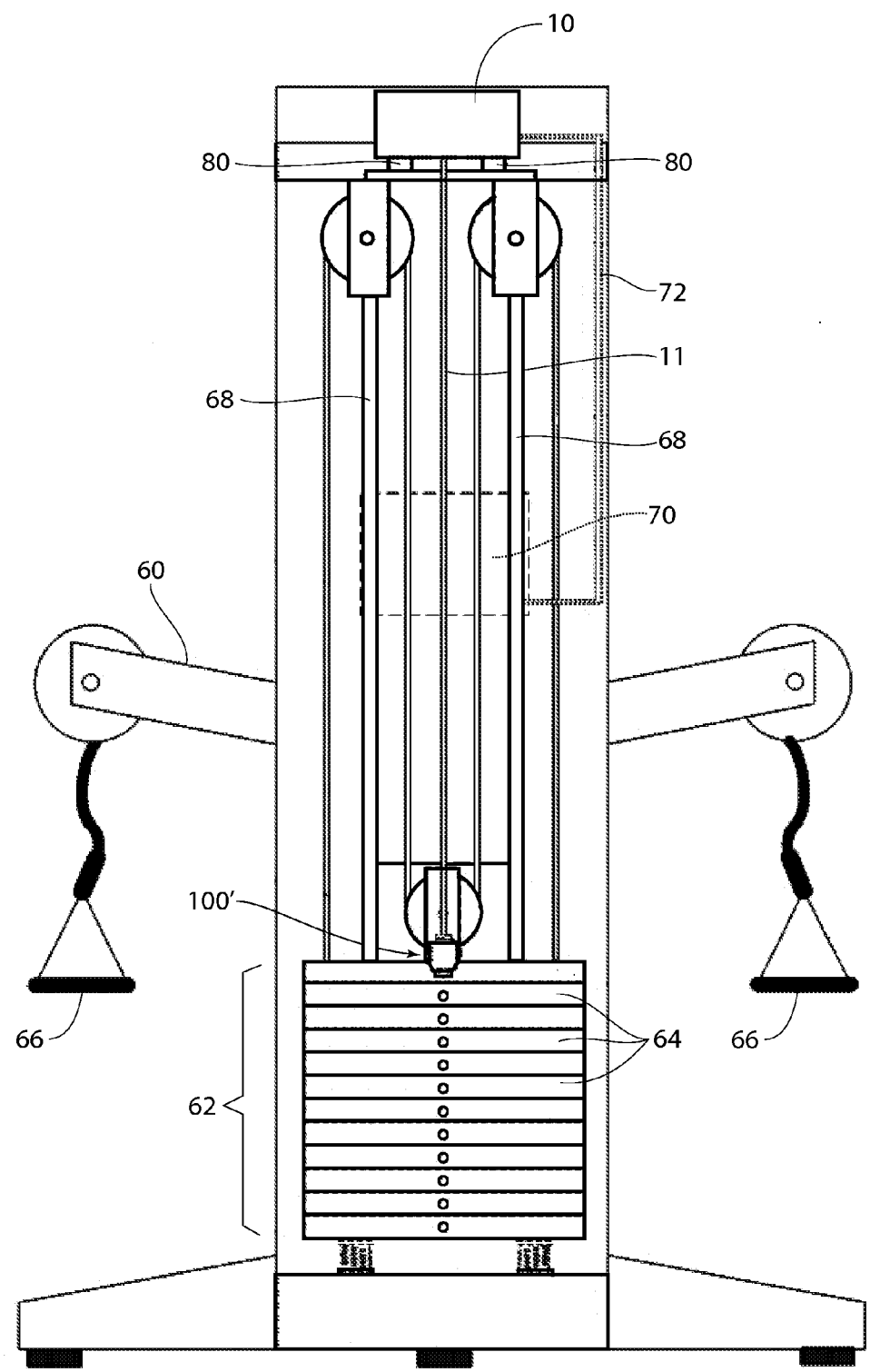
FIG. 10 is an elevation view of an alternative embodiment of an energy harvester coupling arrangement according to the present invention.

In an alternative embodiment of the present invention, referring to FIG. 10, the energy harvester 10 may be mounted in a position that is vertically above the range of motion of the weight stack 62. In the embodiment shown in FIG. 10, the tension profile shown in 11B applies when the energy harvester is not in operation. The flexible cord 11 also remains in tension during operation of the energy harvester 10. The other aspects of the invention are similar to those described herein.

Figure 11A:
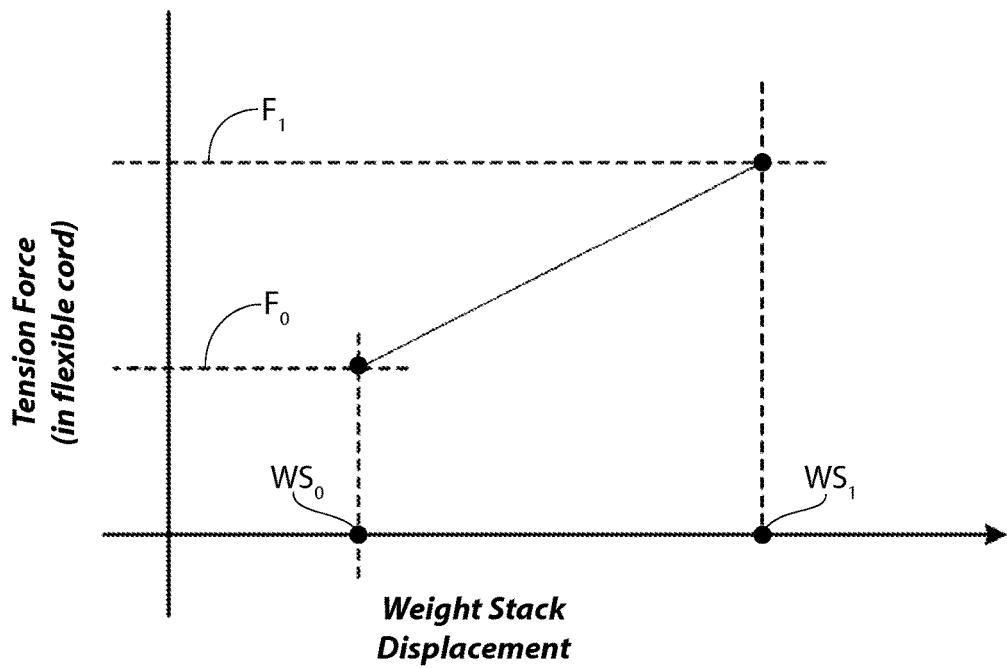
FIG. 11A is a graphical representation of a flexible cord tension force characteristic as a function of weight stack displacement during use of the energy harvester coupling arrangement of FIG. 1.
Figure 11B:
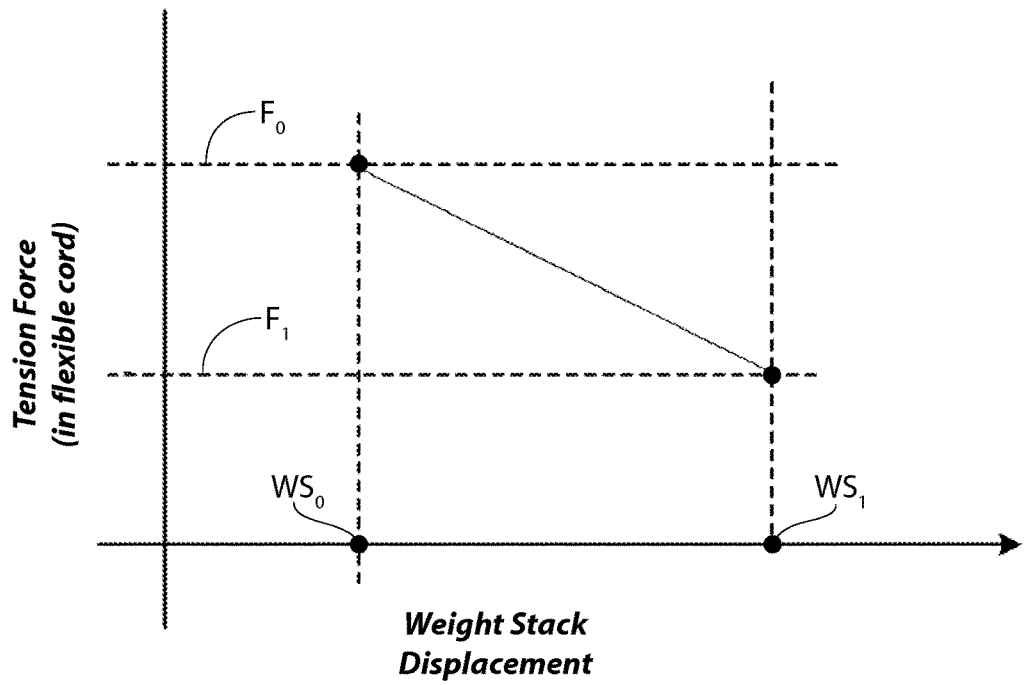
FIG. 11B is a graphical representation of a flexible cord tension force characteristic as a function of weight stack displacement during use of the energy harvester coupling arrangement of FIG. 9.
Figure 11C:
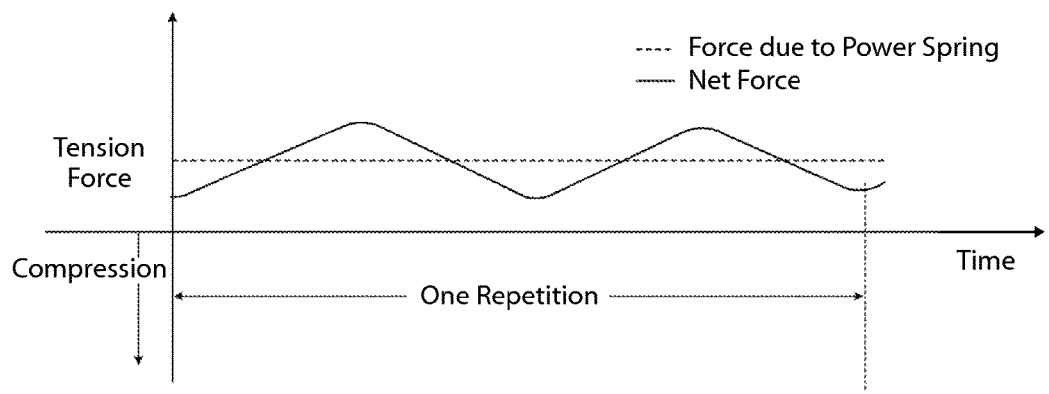
FIG. 11C is a graphical representation of an exemplary time domain waveform of tension force in a flexible cord during an exercise motion with an operable energy harvester in a coupling arrangement according to the present invention.

Referring to FIG. 11A, the power spring 23 within the mechanical reel 22 produces a characteristic of tension in the flexible cord 11, as a function of the vertical displacement of the top weight plate 64a, this vertical displacement is referred to as weight stack displacement in FIG. 11A. The weight stack rest position $WS_0$ corresponds to the location of the weight stack 62 when all members of the weight stack 62 are at rest and the machine 60 is not in use. The tension force in the flexible cord 11 remains preferably substantially constant as a function of the weight stack displacement; that is, the tension force in the flexible cord 11 when some or all of the weight stack 62 is at an elevated weight stack position $WS_1$ (i.e., when at least one weight stack plate 64 is lifted) is substantially similar to the tension force in the flexible cord 11 when the weight stack 62 is in the weight stack rest position $WS_0$. The described characteristic of the tension force as a function of weight stack displacement is sometimes referred to as a near-constant force characteristic. The characteristic depicted in the graph of FIG. 11A applies for the case of an exercise motion without energy harvester operation, i.e., for the condition where no electrical power is produced by the energy harvester 10 in response to a motion of the weight stack 62. Referring now to FIG. 11C, the tension force in the flexible cord 11 due to the energy harvester operation and the near-constant force of the mechanical reel 22 are shown in an exemplary time domain waveform.

Figure 12:
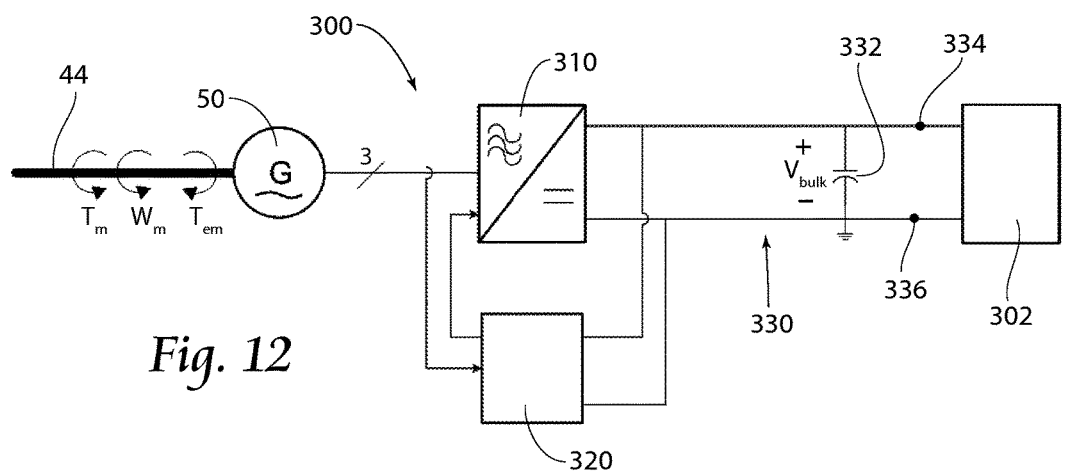
FIG. 12 is a schematic view of an exemplary electrical circuit of an energy harvester system.

Referring to FIG. 12, a schematic is provided of an exemplary electrical circuit 300, including the energy harvester generator 40. The electrical circuit 300 may be completed with an electronics load 302. Generally, the electrical circuit 300 comprises the electrical generator 40 (such as that of the harvester 10) connected to a AC-to-DC converter or inverter 310, control electronics 320, a DC Link 330 comprising a Bulk Capacitor 332, a positive DC link terminal 334, and a negative DC link terminal 336, and the electronics load 302, the electronics load 302 being electrically connected to the DC link 330. The electronics load 302 generally preferably comprises a DC-DC converter to convert the DC link voltage to a supply voltage appropriate for the electronics used in the electronics load 302, for example 12, 5, or 3.3 volts DC may be preferred. The load 302 may further include a battery or capacitor for supplemental energy storage for electrical energy to be used by the electronics load 302 for some period of time after an exercise motion is completed. The electronics load 302 preferably performs a function to enhance or assist the user of the exercise equipment, for example, providing a display of workout metrics such as repetitions, range of motion, and work effort; other examples of electronics load functions include providing wireless communications to a mobile device of a user of the exercise equipment or to a wireless router or device located in a fitness facility. FIG. 12 is provided for exemplary purposes only, and it is understood that various arrangements of electrical circuits for the energy harvester electronics may be used without departing from the scope and intent of the present invention.

Those who are skilled in the art will recognize that the energy harvester in this invention is one embodiment, and is used as an exemplary apparatus to show the benefits of the present invention, in particular, the use of a mechanical reel 22 comprising a flexible cord 11 fastened to the weight stack 62, and the rotating member 22a of the mechanical reel 22 coupled to the rotating member 44 of an electrical generator 50. Other embodiments of energy harvesters exist that fall within the scope and intent of the present invention. In particular, numerous arrangements of an electrical generator 50 that result in rotation of the generator shaft 44 in response to the motion of the mechanical reel 22 fall within the scope of the present invention. As an additional example, the second low speed bearing 32 may be omitted and the housing 22a rotating on the arbor 21 may provide the function of the second low speed bearing 32. Additionally or alternatively, an embodiment of the present invention may include an energy harvester 10 mounted to a surface that is not part of the exercise equipment 60, such as a building surface (e.g., wall or floor), a compliant floor mat in an exercise facility, or may be weighted down with sufficient ballast and simply rested on a floor surface.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A system comprising:
   an exercise device having a mechanical element forming a majority of resistive force to be overcome by an exercise motion of a user of the device, the mechanical element including a main cable moved by the exercise motion and a weight stack including a plurality of plates;
   an electrical generator comprising a rotatable shaft, the electrical generator configured to produce electricity as a result of rotation of the shaft; and
   a flexible cord coupled between the mechanical element and the electrical generator,
   wherein the shaft of the electrical generator is rotated in a first direction during motion of the flexible cord in a first cord direction, and the shaft of the electrical generator is rotated in a second direction during motion of the flexible cord in a second cord direction.

2. The system according to claim 1, wherein the plates are selectively translatable along a translation path between a first position and a second position.

3. The system according to claim 2, further comprising a force limiter connected to the cord and to the weight stack, the force limiter configured to decouple the cord from the weight stack if a tension force conducted by the cord exceeds a predetermined force threshold.

4. The system according to claim 3, wherein the electrical generator comprises a portion of an energy harvester, the energy harvester further comprising a frame and a reel rotatably supported by the frame, wherein the cord extends about an outer circumference of the reel.

5. The system according to claim 4, further comprising a second shaft rotatably supported by the frame, the reel being fixed to the second shaft.

6. The system according to claim 5, wherein the reel comprises a housing radially at least partially surrounding an arbor secured to the frame, the reel substantially containing a biasing member anchored to the arbor and the housing.

7. The system according to claim 6, wherein the biasing member is a constant force spring.

8. The system according to claim 4, further comprising vibration isolation mounts coupled to the frame.

9. The system according to claim 8, wherein the vibration isolation mounts are disposed between the frame and a support surface.

10. The system according to claim 9, wherein the support surface is attached to the exercise device.

11. The system according to claim 4, wherein the exercise device rests upon a floor surface, the energy harvester being positioned between the floor surface and a first height parallel to the floor surface defined by at least one of the plates.

12. A system according to claim 4, wherein the exercise device rests upon a floor surface, all of the plates being positioned between the floor surface and a first height parallel to the floor surface defined by the portion of the frame of the energy harvester closest to the floor surface.

13. The system according to claim 4, further comprising a ballast mass coupled to the frame.

14. The system according to claim 3, wherein the force limiter comprises a magnet.

15. A system according to claim 3, wherein the force limiter comprises a mechanical fuse.

16. The system according to claim 2, wherein the translation path is linear.

17. The system according to claim 1, the electrical generator comprising a direct current generator.

18. The system according to claim 1, the electrical generator comprising an alternating current generator.

* * * * *